United States Patent [19]

Martin

[11] 4,133,574
[45] Jan. 9, 1979

[54] GUARD-CAB FOR COLD ROOM

[76] Inventor: Robert P. Martin, 7809 W. 130th St., Parma, Ohio 44130

[21] Appl. No.: 735,680

[22] Filed: Oct. 26, 1976

[51] Int. Cl.² ............................................. B62D 25/02
[52] U.S. Cl. .................................. 296/28 C; 165/43; 237/28; 296/147
[58] Field of Search ............... 237/28, 12.3 R, 12.3 A; 296/28 C, 146, 147, 149, 150; 165/42, 43

[56] References Cited

U.S. PATENT DOCUMENTS

| | | | |
|---|---|---|---|
| 3,042,561 | 7/1962 | Iwashita | 296/97 F |
| 3,501,095 | 3/1970 | Peterson | 237/12.3 A |
| 3,524,398 | 8/1970 | Wintrey | 165/42 |
| 3,555,846 | 1/1971 | Harbeck et al. | 165/42 |
| 3,999,599 | 12/1976 | Zvege | 165/43 |
| 4,034,204 | 7/1977 | Windsor et al. | 165/43 |
| 4,063,682 | 12/1977 | Orcutt | 165/42 |
| 4,069,972 | 1/1978 | Hausmann | 237/12.3 R |

*Primary Examiner*—Richard A. Bertsch
*Attorney, Agent, or Firm*—McNenny, Pearne, Gordon, Gail, Dickinson & Schiller

[57] ABSTRACT

A lift truck cab having thermally insulated walls and an electrically energized heater system making it particularly suited for use with electric lift trucks in closed cold environments. The heater system is spaced throughout the cab to surround the operator and provide a uniform distribution of heat. Double hinged doors forming the sides of the cab permit passage of the operator when partially opened and complete access to the vehicle when fully opened.

17 Claims, 7 Drawing Figures

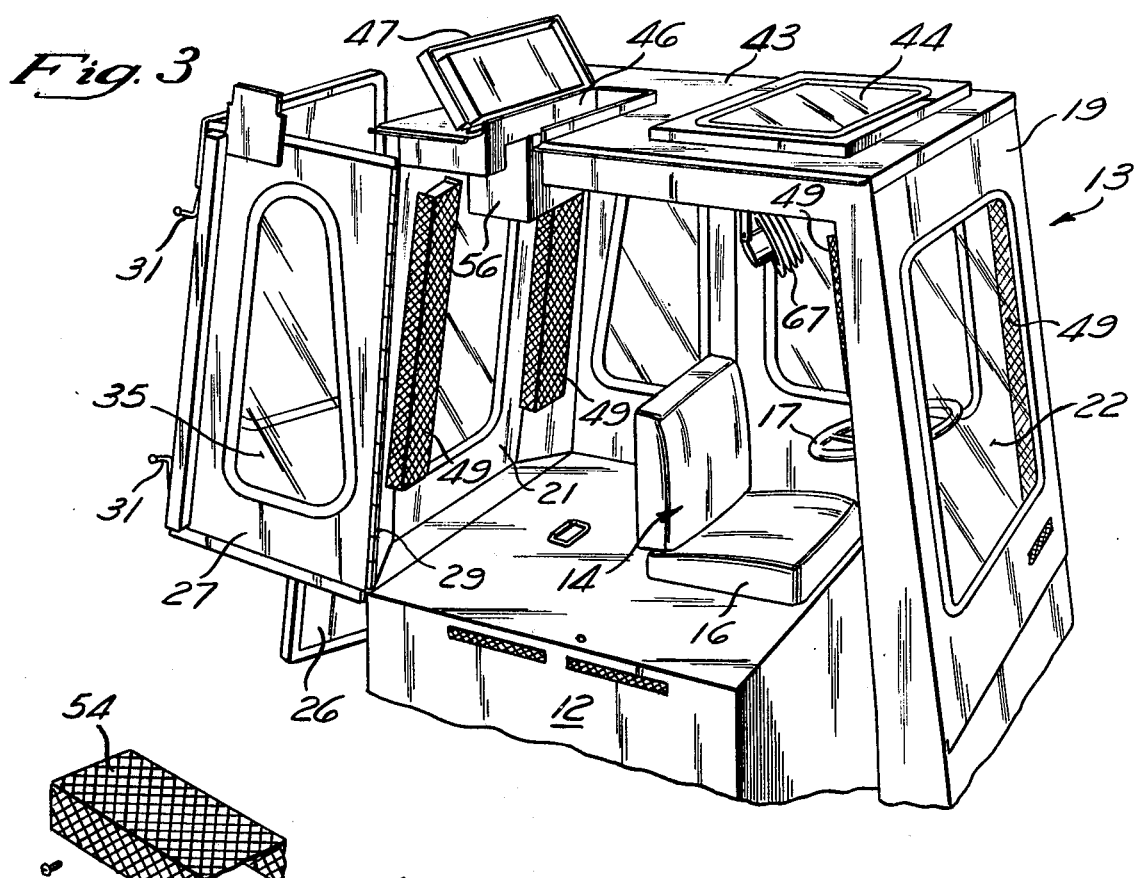
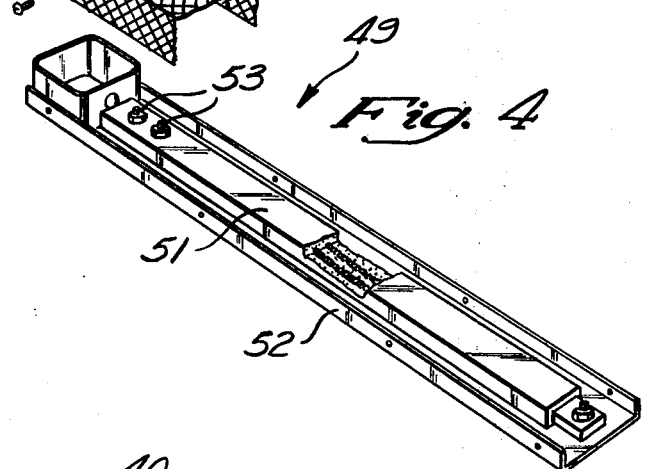
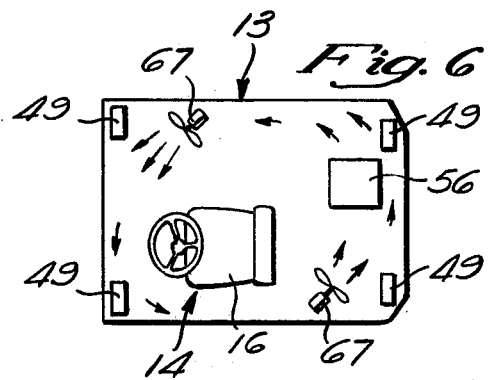
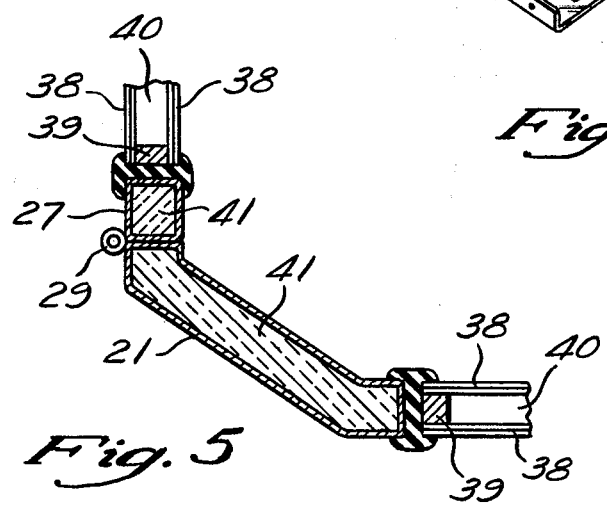
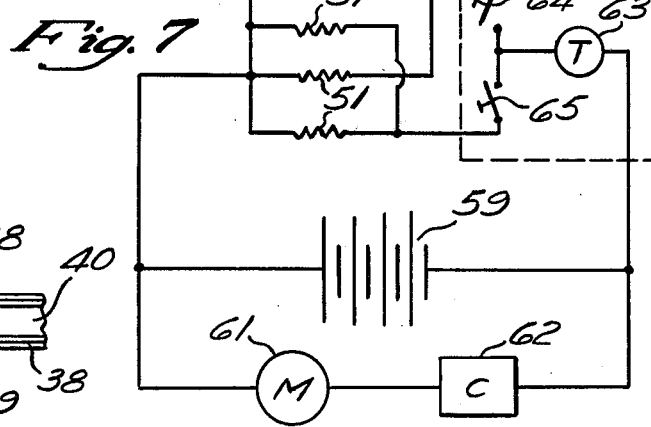

GUARD-CAB FOR COLD ROOM

BACKGROUND OF THE INVENTION

The invention relates to improvements in cabs for lift trucks and, in particular, to a cab suitable for use in cold environments.

PRIOR ART

Previous cabs for industrial lift trucks have generally provided protection against only moderately cold temperatures. While cabs of internal combustion powered lift trucks may be heated with waste engine heat, attempts to heat the cabs of electric battery-powered trucks have been limited and apparently have primarily involved the use of auxiliary heaters employing propane or other combustible fuels. Characteristically, such combustion heaters have the serious disadvantage of producing noxious gases. Thus, use of such auxiliary heaters defeats a primary purpose of using exhaust-free, battery-driven electric lift trucks in closed environments, such as in buildings, tunnels, or the like. There has accordingly existed a need for a lift truck cab capable of protecting an operator from cold temperatures during extended periods of operation in closed environments.

SUMMARY OF THE INVENTION

The invention provides a heated cab for an electric lift truck which efficiently utilizes battery energy to operate an electric heater circuit and thereby maintain the cab interior at a comfortable temperature during operation in an environment of freezing or subfreezing temperatures. Electric heating means is arranged to radiate a substantial portion of heat directly to the operator so that the air temperature within the cab may be maintained at a relatively low temperature to reduce the rate of heat loss from the cab.

As disclosed, the electric heating means is provided as a plurality of elements spaced about the interior of the cab to achieve a uniform temperature distribution. Thermostatic control means are disposed within the cab at a position which affords measurement of cab temperature approximately at the level of the operator's head for ideal comfort conditions and at a point which is within exposure to direct radiation from at least one of the heater elements so that it is directly responsive to radiation as well as air temperature. Temperature uniformity achieved by the spaced network of heating elements is augmented by air circulating fans spaced at advantageous points within the cab interior.

As a result of maintaining the cab interior at a temperature comfortable for the operator, productivity is substantially improved. By way of example, in one instance involving operations at a freezer storage facility, at an ambient temperature of −10° F. operators could previously withstand only 20 to 30 minutes of operating time within the freezer area before requiring relief, while with the disclosed cab, operators wearing less clothing are enabled to remain up to two hours without interruption.

In accordance with an important feature of the invention, the sides of the cab comprise multiple hinged door panels which, when partially opened, permit convenient access and egress for the operator, and when fully opened provide clearance for battery exchange and truck maintenance. Multiple hinging of the door panels avoids the necessity of moving a full width door unit for operator passage, thereby minimizing the operator's effort expended in door opening and closing, and minimizing the amount of heat loss from the cab during periods in which the door area is partially open.

BRIEF DESCRIPTION OF THE DRAWINGS

FIG. 3 is a perspective side view of the cab displaying a door assembly in a second opening mode, and showing an overhead hatch in its open position;

FIG. 4 is a perspective, partially exploded view of a heating element, with portions broken away to reveal details thereof;

FIG. 5 is a fragmentary, cross sectional view of portions of a corner of the cab as indicated by the line 5—5 of FIG. 1;

FIG. 6 is a schematic plan view of the cab interior; and

FIG. 7 is a schematic electrical diagram illustrating a control circuit for the electrical heaters.

DESCRIPTION OF THE PREFERRED EMBODIMENT

Figure 1:
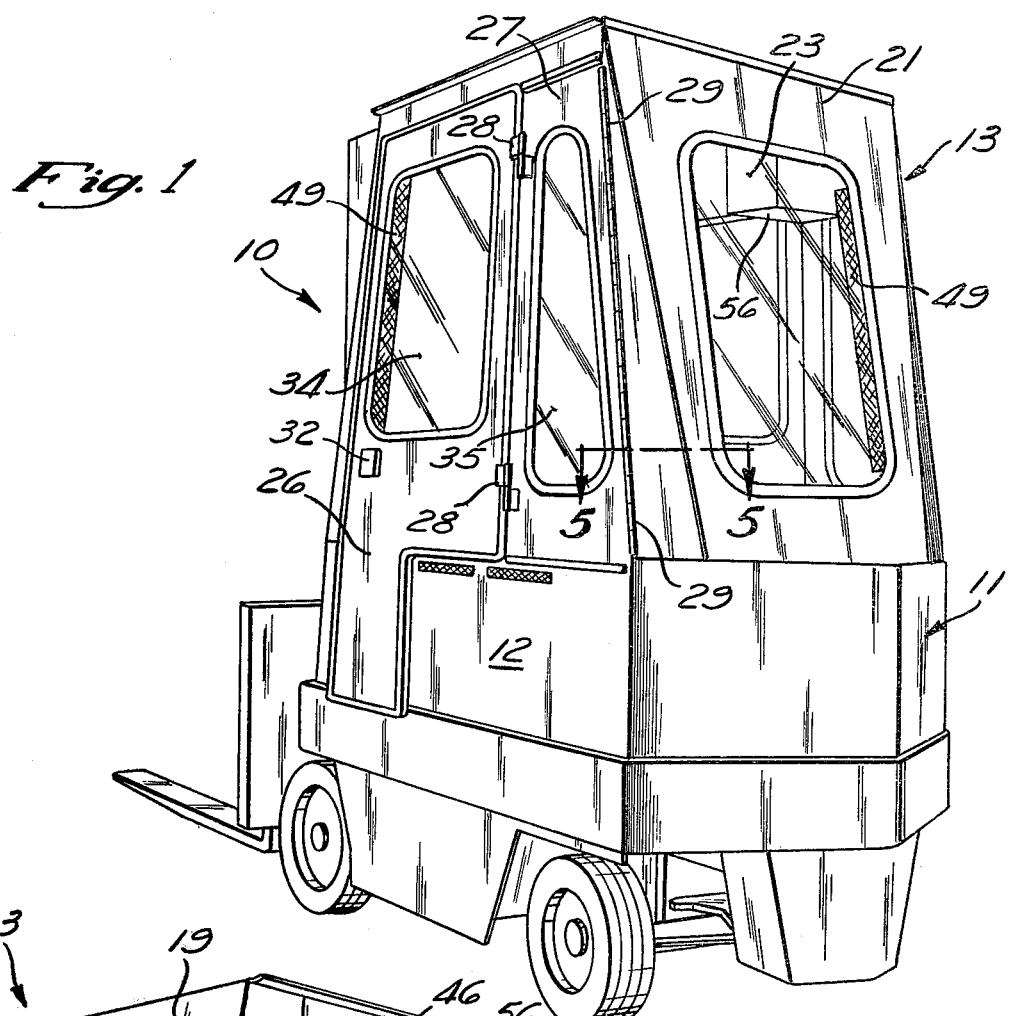
FIG. 1 is a perspective rear view of an industrial lift truck incorporating a cab constructed in accordance with the invention.

A conventional industrial electric lift truck 10 includes a wheeled body 11. The body 11 includes side covers 12 which are removable or otherwise displaceable to provide access to a drive motor or motors and a storage battery or batteries both carried on the body. In the illustrated embodiment, a cab 13 is separately formed from the body 11 and is suitably attached to the body as by bolts or other suitable fastening means. Where desired, the cab 13 may be fabricated and installed on an existing overhead protection frame or roll cage. As shown, the cab encloses substantially all of the upper side of the body 11, including an operator station 14, which includes an operator seat 16 and steering wheel 17.

Figure 2:
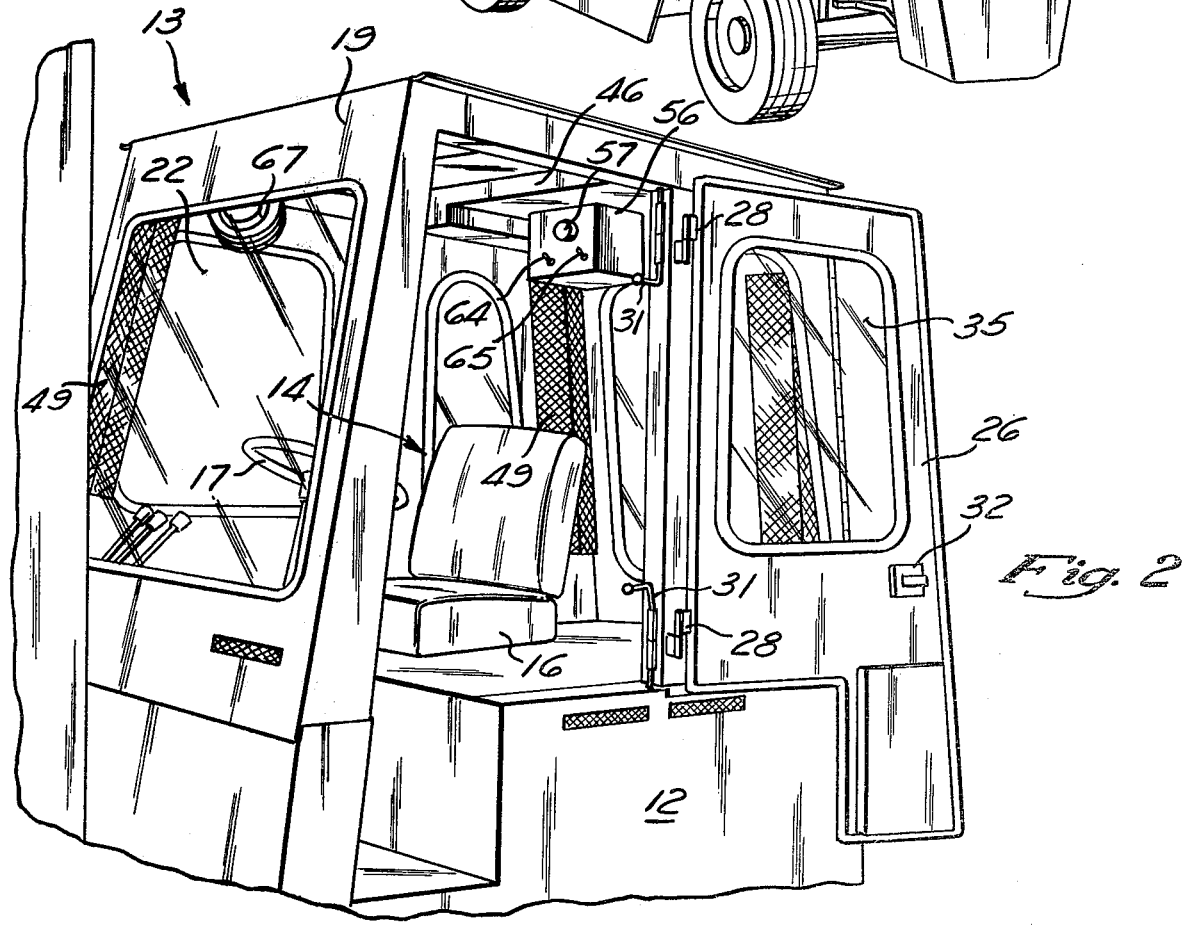
FIG. 2 is a perspective front view of the cab illustrating a door assembly in a first opening mode.

The cab 13 includes windowed front and rear wall panels 19 and 21, respectively, and is generally symmetrical from left to right sides. Front and rear windshields 22 and 23, providing visibility from the operator station 14, extend over substantial portions of their respective panels 19 and 21. The sidewalls of the cab are each substantially solely formed by a pair of door panels 26 and 27. As shown, each door panel 26 and 27 is separately hinged on a vertical or near vertical hinge axis, with hinges 28 on the trailing edges of the forward door panels 26 being carried on the leading edges of the rearward door panels 27. The hinges 28 of the forward door panels 26 are of the type which permit removal of the panels by simple lifting action on the panel and upper half of the hinges. The rear door panels 27 are conveniently mounted on continuous hinges 29. The rear door panels 27 are releasably held in their closed position by slide bolts 31, while the front door panels 26 are releasably held in their closed position by flush-mounted latches 32 of a suitable commercially available design. As indicated in FIGS. 2 and 3, in a partially open mode only the forward panel 26 is unlatched and swung away from the body, while the rear panel remains closed and latched by the bolts 31. In a fully open mode, both door panels 26, 27 are unlatched and swung away from the body 11. As shown, each door panel 26 and 27 is provided with lights or windows 34 and 35, respectively, which are relatively large in comparison to the area of their respective door panels. The lights 34 of the front panels 26 are advantageously formed in two sections, the forwardmost section being horizontally slidable for opening. The front and rear cab panels 19 and 21, as well as the door panels 26 and 27, are provided with suitable weatherstripping to seal against the body 11.

All of the vertical or near vertical windows 22, 23, 34, and 35, as suggested in FIG. 5, are thermally insulated by means of spaced, double panes of safety glass such as those units marketed under the registered trademark "THERMOPANE." Each pane of safety glass is preferably formed of two glass layers each bonded to an intermediate plastic film. The panes are hermetically sealed along their edges to an interposed, rectangular metal frame 39, thereby providing an insulating space 40.

The exterior sides of the door panels 26 and 27, as well as the front and rear cab panels 19 and 21, are preferably fabricated of steel sheet stock of a suitable gauge, such as 13 ga. (0.093"). These panels 19, 21, 26, and 27 are thermally insulated by a layer 41 of insulation material such as a one-inch thickness of conventional insulating foam or, where desired, fiberglass insulation. The insulation 41 is protected at the interior of the cab by sheet steel stock of the same gauge as the sheets forming the outer surfaces. Windshield wipers (not shown) electrically driven by the vehicle battery are provided for the front and rear windshields 22 and 23 when desired.

A top panel 43 of the cab 13 is constructed in substantially the same manner as the vertical panels, that is, with a pair of spaced steel sheets and an intermediate layer of insulation. Where the top panel 43 provides overhead protection from falling objects or rollover, one of the steel sheets is formed of relatively heavy stock, for example, quarter-inch plate, while the other sheet is relatively lighter, for example 14 ga. (0.074"). An overhead light or window 44 is glazed with a single sheet of transparent, rigid plastic where frosting of this area is not a critical problem. Alternatively, this overhead light 44 may be glazed in the same manner as the thermally insulated, vertical windows previously described.

A slot 46 is formed in the top panel 43 from one side of the cab to a point beyond the longitudinal center of the cab. A cover or hatch 47 is hinged on the top panel 43 in a manner which permits it to seal the slot 46 when closed and afford vertical access through the slot when open. The hatch 47 is constructed in generally the same manner as the vertical panels 19 and 21, with spaced interior and exterior sheet steel and an intermediate layer of thermal insulation.

A set of electric strip heaters 49, spaced about the interior of the cab 13, is adapted to maintain a comfortable heated environment within the cab. As shown, the heaters 49 are provided as a set of four units, one unit being positioned in a generally vertical orientation in each corner of the cab (FIG. 6) so that the heater units 49 thereby surround the operator's station 14. FIG. 4 illustrates constructional details of a preferred heating unit 49. A bar-shaped electrical resistance heater element 51 of known construction, such as a strip heater sold under the registered trademark "CHROMALOX," is screwed or otherwise secured to a U-shaped sheet metal base 52. Terminals 53 at one end of the heater bar strips 51 are electrically connected to the main battery powering the lift truck, as discussed in greater detail below.

A grid 54 of expanded sheet metal is formed into a shallow channel and is assembled on the heater base channel 52 and secured thereto by screws or the like for protection against contact with the heater bar strips 49, which would be harmful during operation at the operational temperature of the strips. The heaters 49 are mounted with screws or other fastening means on the interior surfaces of the cab.

A boxlike housing 56, preferably fabricated of sheet metal, provides a control center for the heating units 49. The housing 56 is mounted in the rear of the cab 13 approximately at the height of the operator's head. By way of reference, the control housing 56 is therefore preferably within a vertical zone approximately corresponding to the upper half of the front windshield 22. A thermostat within the housing 56 is adjustable by an external knob 57 on the housing 56 to selectively determine an air temperature within the cab.

FIG. 7 illustrates a simplified control circuit 58 by which the heater units 49 are energized by the main storage battery, designated 59, of the lift truck. The lift truck motor driving at least one of the wheels and the motor control are schematically shown at 61 and 62. The heater units 49 are connected to the battery 59 in parallel under control of the thermostat 63. Switches 64 and 65 permit selective operation of pairs of the heater units 49 when their total output capacity is not desired. Preferably, each switch 64 or 65 controls a pair of heater units 49, which are diagonal from one another in the cab 13. A pair of electric motor-driven fans 67 electrically connected to the vehicle battery 61 are operable under the control of a switch in the housing 56 to circulate air throughout the cab interior. The fans 67 are suspended by suitable brackets from the top cab panel 43.

The disclosed thermally insulated electrically heated cab assembly 13, when combined with an electric lift truck, is particularly suited for operation in enclosed cold storage areas where exhaust gases of an internal combustion engine or fumes from a combustion heater would present danger of monoxide poisoning. The double hinged doors 26 and 27 enable an operator to enter or exit the cab 13 with a minimum of effort, since only the forward door panel 26 need be opened for his passage. The door opening area of the front panel 26 is, of course, less than that of the front-to-rear side area of the cab so that loss of heated air from the cab interior to the surrounding environment upon opening of the single panel is less than that which would otherwise be opened if a single door extending from the front cab wall 19 to the rear wall 21 were provided. With both of the door panels 26, 27 open at a side, the associated body panels 12 may be removed for full access to the battery compartment, motor, or other equipment. When open, the insulated overhead hatch 47 allows the battery to be conveniently hoisted from and moved laterally of the body 11.

The heater strip elements 51 are designed to operate with their outer surfaces at a temperature sufficiently elevated above normal room temperatures and cab temperature, for example, about 400° F., such that a substantial portion of their generated heat energy is distributed by radiation to the cab interior. Each strip heater may have, by way of example, an individual rating of 500 watts. As disclosed, the heating units 51 face toward the operator's station so that the operator receives adequate heat to maintain a comfortable skin temperature while the cab air may be maintained at a temperature which would otherwise be considered less than comfortable. Operation at a relatively low cab temperature, for example 65° F., reduces heat lost to the environment by conduction through the cab walls. Distribution of the heaters 49 in an arrangement surrounding the operator's station 14 from four widely spaced points, as shown in FIG. 6, assures that the cab and operator's station are uniformly heated. The thermostat control housing 56, as shown, is positioned at a location at which it receives direct radiation from a plurality of the heater units 49 so that the thermostat 63 therein is responsive to radiation heat in addition to cab air temperature. As indicated in FIG. 6, the fans are arranged to cooperate with one another to circulate air in a vortical pattern over the heater units 49 to assure uniform temperature and distribution of air to defrost all of the cab windows.

The invention is not restricted to the slavish imitation of each and every detail set forth above. Obviously, devices may be provided which change, eliminate, or add certain specific details without departing from the scope of the invention.

What is claimed is:

1. A lift truck comprising a wheel-supported body, an electric motor on the body for driving the truck through at least one of the wheels, a battery on the body for energizing the drive motor, an operator station on the body, a cab enclosing the operator station, said cab having a plurality of panels including a top, a plurality of windows carried by said panels, the major area of said panels and said windows being thermally insulated, electrical resistance heater means arranged to heat the interior of the cab, thermostatic control means sensitive to the air temperature within the cab, and an electric circuit connecting said heater with said battery through said thermostatic control means whereby said cab is maintained at a temperature selectively determined by said thermostat.

2. A lift truck as set forth in claim 1, wherein said thermostatic control means is mounted within said cab.

3. A lift truck as set forth in claim 2, wherein at least one of said windows forms a windshield for said operator station, said thermostatic control means being supported at a level at least as high as said windshield.

4. A lift truck as set forth in claim 2, wherein said heater means is arranged to operate at an elevated temperature and is arranged to radiate directly towards said operator station.

5. A lift truck as set forth in claim 4, wherein said thermostatic control means is at a location exposed to direct radiation from said heater means.

6. A lift truck as set forth in claim 5, wherein said heater means is disposed at a plurality of locations surrounding the operator station.

7. A cab for enclosing the operator station of a battery-powered lift truck comprising a plurality of panels forming the front and rear, sides and top of the enclosure, at least some of said panels including windows to provide visibility from the operator station, electrical resistance heater means arranged to heat the interior of the cab, said heater means including a plurality of units separately mounted within the cab in a pattern surrounding the operator station, thermostatic control means sensitive to the air temperature within the cab, and an electric circuit for connecting said heater means with the battery of the lift truck through said thermostatic control means, whereby said cab is adapted to be maintained at a temperature selectively determined by said thermostatic control means.

8. A lift truck cab as set forth in claim 7, wherein said heater units are arranged within said cab to face generally towards the operator station and are adapted to radiate a substantial portion of their generated heat energy.

9. A lift truck cab as set forth in claim 7 wherein said panels are generally vertical, adjacent ones of said panels intersecting with one another to define generally vertically extending corners of said cab, said heater units being longitudinally aligned with and adjacent said corners, said heater units extending along a major portion of the length of said corners.

10. A lift truck cab as set forth in claim 8, including air circulating means for directing air over said heating units and said windows.

11. A lift truck cab as set forth in claim 10, wherein said air circulating means comprises a pair of fans for cooperatively developing a vortical pattern of air flow in the cab.

12. A cab for enclosing the operator station of a lift truck, comprising a plurality of panels forming the front, rear, sides, and top of the cab enclosure, at least some of said panels including windows to provide visibility from the operator station, at least one of the sides of the cab including hinged forward and rearward door panels, said forward and rearward side door panels cooperating to substantially close all of the side cab area between the rear and front cab panels, said door panels being constructed and arranged to permit the forward door panel to be opened and closed for passage of the operator while the rearward door panel is closed and to permit both the forward and rearward door panel to be opened to provide access to the body of the lift truck.

13. A lift truck cab as set forth in claim 12, wherein the trailing edge of the forward door panel is hinge-supported on the lead edge of the rearward door panel.

14. A lift truck cab as set forth in claim 13, wherein the rearward door panel is hinged on the cab at its trailing edge and said forward and rearward door panels are each arranged to swing on their respective hinges outwardly from the body.

15. A lift truck cab as set forth in claim 14, wherein a panel forming the top portion of the enclosure includes a slot extending from the side of the cab having said forward and rearward door panels to a point beyond the longitudinal center of the cab enclosure, and a movable hatch mounted on the top panel for closing said slot.

16. A lift truck cab as set forth in claim 15, wherein said panels, windows, and slot cover are thermally insulated.

17. A lift truck cab as set forth in claim 16, including electric heater means within said cab and thermostatic control means for sensing the air temperature within the cab and operable to energize said heater means to maintain a predetermined temperature therein.

* * * * *